United States Patent [19]

McCoy

[11] Patent Number: 5,529,329

[45] Date of Patent: Jun. 25, 1996

[54] FIFTH WHEEL HITCH WITH SIDE PIVOT LOCK

[75] Inventor: Richard McCoy, Granger, Ind.

[73] Assignee: Reese Products, Inc., Elkhart, Ind.

[21] Appl. No.: 345,198

[22] Filed: Nov. 28, 1994

[51] Int. Cl.$^6$ ................................................. B62D 53/08
[52] U.S. Cl. ........................ 280/438.1; 280/437; 280/901
[58] Field of Search ............................. 280/437, 438.1, 280/433, 423.1, 415.1, 901

[56] References Cited

U.S. PATENT DOCUMENTS

| | | |
|---|---|---|
| 2,621,056 | 12/1952 | Kayler . |
| 2,749,144 | 6/1956 | Kayler . |
| 3,198,549 | 8/1965 | Martin . |
| 3,847,414 | 11/1974 | Madura . |
| 4,017,095 | 4/1977 | Best ................................ 280/438.1 |

*Primary Examiner*—Mitchell J. Hill
*Attorney, Agent, or Firm*—King & Schickli

[57] ABSTRACT

A fifth wheel hitch assembly includes a frame for mounting to a towing vehicle and a head assembly including a jaw mechanism for engaging a trailer. The head assembly is mounted to the frame so as to allow for relative fore-and-aft as well as side-to-side pivotal movement. A side pivot lock mechanism, including a contoured plate, over-center spring and control handle, allow the user to selectively lock the head assembly relative to the frame and prevent side-to-side pivotal movement as desired.

14 Claims, 3 Drawing Sheets

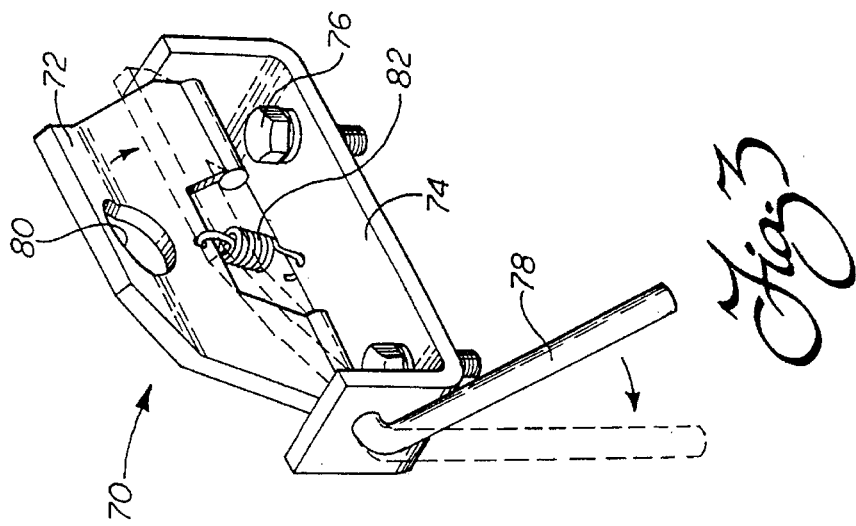
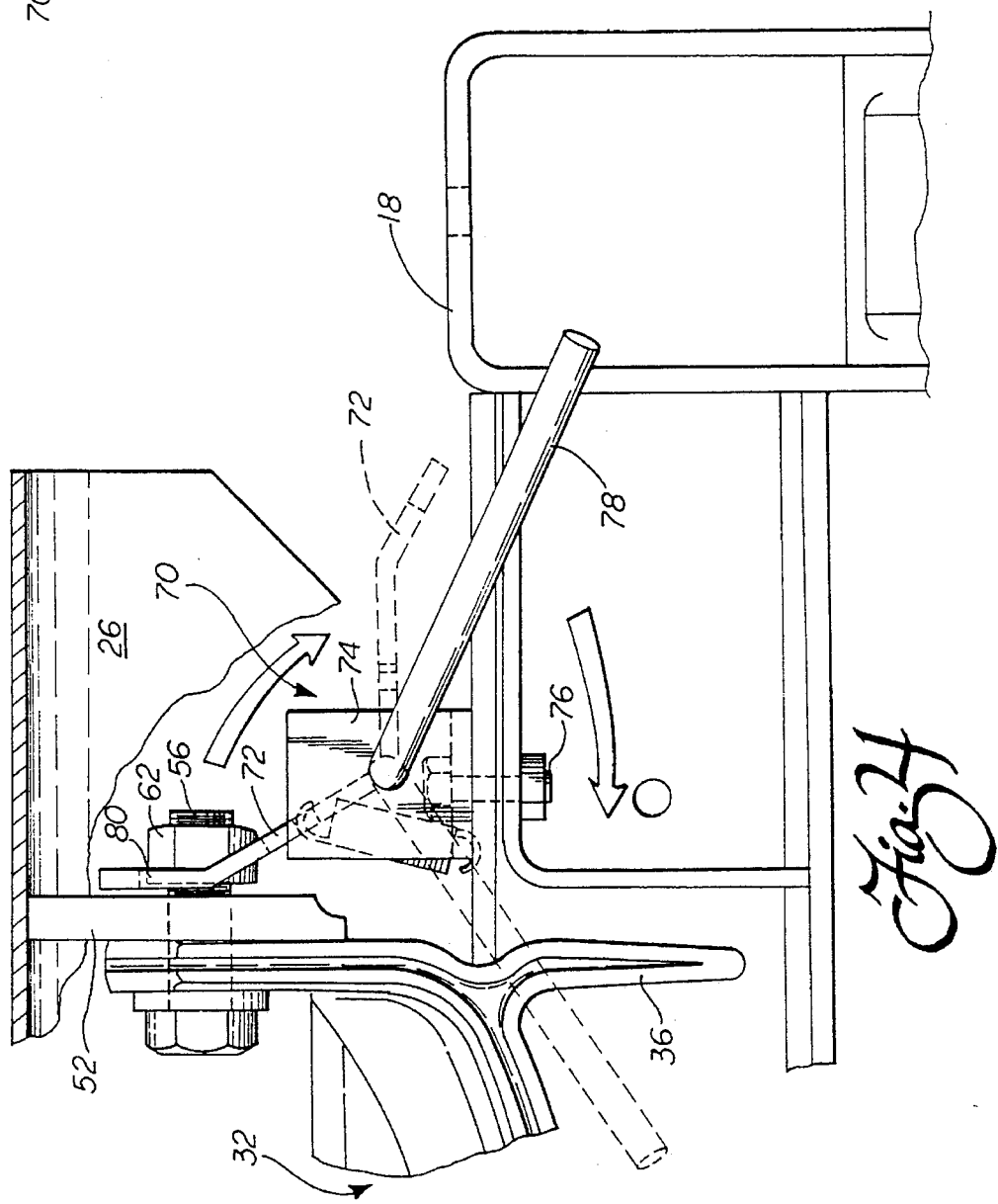

FIFTH WHEEL HITCH WITH SIDE PIVOT LOCK

TECHNICAL FIELD

The present invention relates generally to the trailer towing field and, more particularly, to an improved fifth wheel hitch providing enhanced maneuverability for low speed towing and an operator option for reducing the transmission of vibrations from the trailer so as to increase operator comfort.

BACKGROUND OF THE INVENTION

Fifth wheel hitches for towing a trailer behind a towing vehicle, such as a pickup truck, have long been known in the art. Examples of state of the art fifth wheel hitches include those presently manufactured by Reese Products, Inc. of Elkhart, Ind. under product numbers 30026, 30027 and 30028.

These state of the art fifth wheel hitches include a support frame for mounting the hitch to the towing vehicle, such as, for example, to the bed of a pickup truck. The support frame includes a pair of mounting rails that are bolted to the bed and/or frame of the truck, side brackets that are releasably mounted to the rails and a head support mounted to the side brackets. A head assembly is mounted to the head support by means of a trunnion arrangement allowing fore-and-aft pivotal movement. The head assembly includes a jaw assembly, operable by means of a control handle, that is specifically adapted to releasably engage and hold a king pin of a trailer desired to be towed by the towing vehicle.

While such state of the art fifth wheel hitches provide excellent overall performance and dependable operation, it has been found that improvements in design are still possible. More particularly, the state of the art fifth wheel hitches just described have a head assembly that allows for only fore-and-aft pivotal movement. No side-to-side pivotal movement is provided. Accordingly, under certain operating conditions including the traversing of a grade or when maneuvering at relatively low speed in a confined area and turning sharply, significant strain is placed upon the jaw assembly.

Recognizing this shortcoming, a new generation of fifth wheel hitch assemblies has recently been developed providing for both side-to-side and fore-and-aft pivotal movement of the head assembly. As a result, some of this strain placed on the jaw assembly is relieved. In this way the service life of the jaw assembly and, therefore, the fifth wheel hitch may be extended and the integrity of the coupling with the trailer enhanced. Further, significant improvements in low speed maneuverability are achieved. However, some users still prefer, at least under certain road and weather conditions, the more rigid towing platform provided by limiting pivotal movement exclusively to the fore-and-aft direction. A need is, therefore, identified for a fifth wheel hitch assembly allowing the operator to choose between a towing platform providing both fore-and-aft and side-to-side pivotal movement or fore-and aft pivotal movement alone.

SUMMARY OF THE INVENTION

Accordingly, it is an of the present invention to provide a fifth wheel hitch of improved design for towing a trailer behind a towing vehicle that is capable of providing dependable performance over a long service life.

An additional object of the present invention is to provide a fifth wheel hitch assembly that allows the user to optionally reduce the transmission of vibrations from the trailer to the operator cabin of the towing vehicle during high speed towing and enhance maneuverability during low speed towing through the provision of both fore-and-aft as well as side-to-side pivotal movement of the head assembly.

Another object of the present invention is to provide a fifth wheel hitch including a support frame and head assembly wherein the head assembly is pivotally mounted on the support frame so as to selectively allow pivotal fore-and-aft movement alone to provide a more rigid towing platform desired by some operators or, alternatively, both fore-and-aft as well as, side-to-side pivotal movement to provide a more compliant towing platform as desired by other operators. In this way the more desired performance characteristics of the fifth wheel hitch assembly are made readily available to an operator under substantially any operating conditions.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved fifth wheel hitch is provided for towing a trailer behind a towing vehicle. The fifth wheel hitch assembly includes a support frame for mounting to the towing vehicle and a head assembly including jaw means for releasably engaging the king pin of the trailer. Further, means are provided for pivotally mounting the head assembly to the support frame so as to allow pivotal movement in two orthogonal directions: that is, fore-and-aft and side-to-side. In addition, the hitch assembly includes a means for selectively preventing or restricting pivotal movement in the side-to-side direction when desired by the individual towing the trailer.

The means for pivotally mounting the head assembly to the support frame includes a pivot beam. The pivot beam includes a cross member interconnecting two opposing uprights. An aperture is provided in the center of the cross member. A main pivot pin is received in this aperture and cooperating apertures in the head support so as to mount the beam and head assembly for pivotable movement about a first axis in a side-to-side direction relative to the support frame and towing vehicle.

One mounting aperture is also provided in each upright. Additionally, the apertures in the uprights are aligned on a second axis orthogonal to the first axis. Two pivots pivotally connect the head assembly to each of the uprights through the mounting apertures. Accordingly, pivotal movement of the head assembly is provided in the fore-and-aft direction as well. Advantageously, this free pivotal movement in two orthogonal directions allows the head assembly to more closely follow the king pin during towing, actually allowing the head assembly to maintain full contact with the king pin plate under substantially any anticipatable operating conditions. Further, this freely compliant movement of the head assembly reduces the transmission of vibrations from the trailer through the hitch assembly to the passenger or operator compartment of the towing vehicle. Thus, the operator of the vehicle is provided with the utmost confidence and control while towing and particularly when maneuvering through tight quarters and while making sharp turns at low speeds.

The means for selectively preventing pivotal movement in the side-to-side direction preferably comprises a contoured plate pivotally mounted in a U-shaped yoke that is fixed to the frame. The plate is selectively displaceable between locked and unlocked positions. In the locked position the plate engages the pivot beam or more particularly one of the pivots about which the head assembly pivots in the fore-and-aft direction thereby preventing relative side-to-side pivotal movement of the pivot beam. Fore-and-aft pivotal movement of the head assembly about the pivot is, however, still possible. In the unlocked position, the plate is disengaged and free from the pivot beam and pivot thereby allowing both relative side-to-side and fore-and-aft pivotal movement of the head assembly on the support frame.

In accordance with yet another aspect of the present invention a control handle is operatively connected to the plate for manually manipulating the plate between the locked and unlocked positions. Further, an over-center spring is provided operatively connected between the contoured plate and the U-shaped yoke. The over-center spring provides a biasing force necessary to hold the plate in either the locked or unlocked position. Specifically, an intermediate transitional position of the plate between the locked and unlocked positions creates the longest spring pull so that the spring always retracts to hold the plate in either the locked or unlocked position as desired.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 3 is a detailed perspective view of the side pivot lock mechanism; and

FIG. 4 is a detailed front elevational view of the invention showing the pivotal contoured plate in both the locked position (full line) and the unlocked position (dashed line).

Reference will now be made in detail to the present preferred embodiment of the invention, an example of which is illustrated in the accompanying drawing.

DETAILED DESCRIPTION OF THE INVENTION

Figure 1:
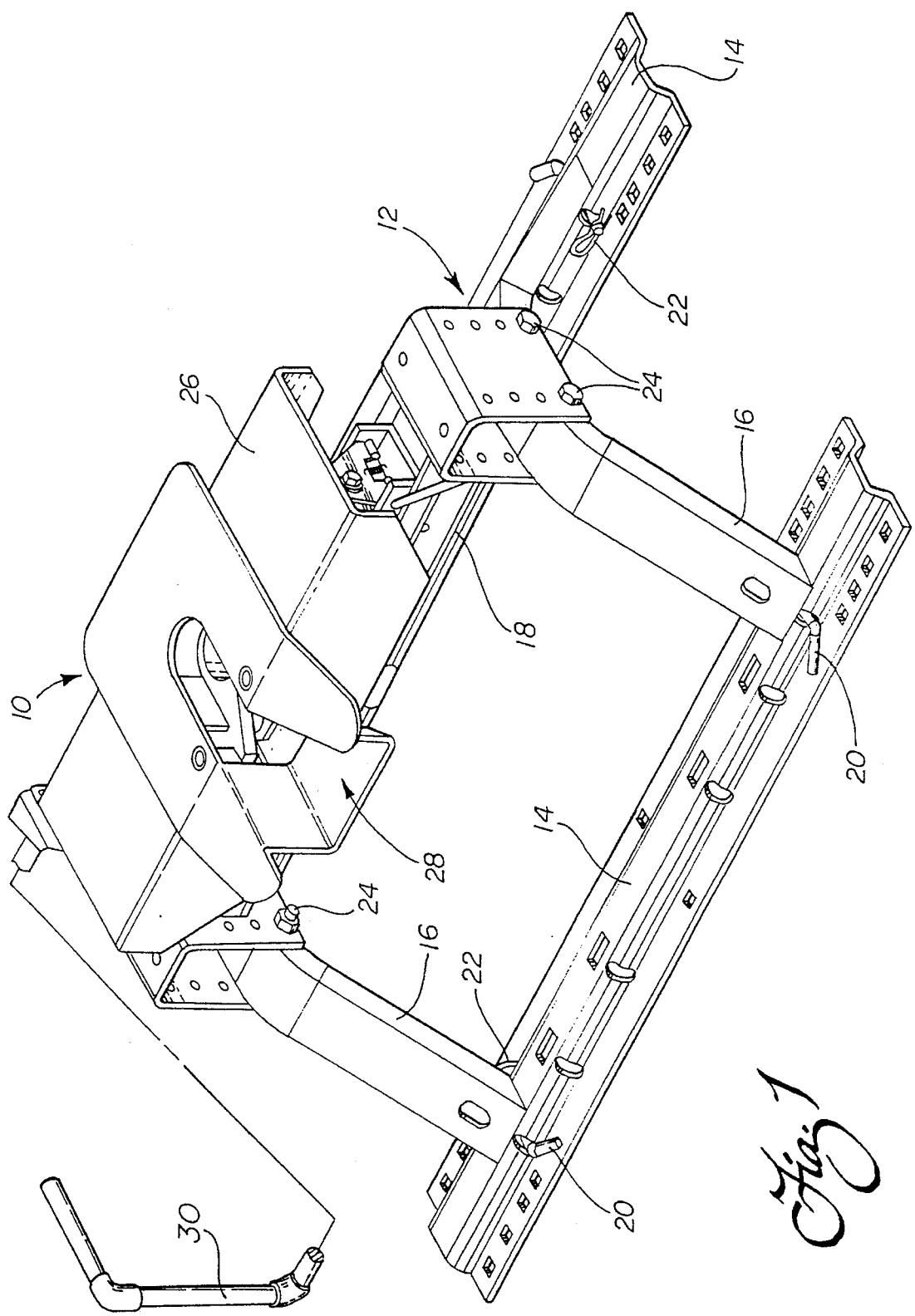
FIG. 1 is a perspective view of the fifth wheel hitch of the present invention for towing a trailer behind a towing vehicle.
Figure 2:
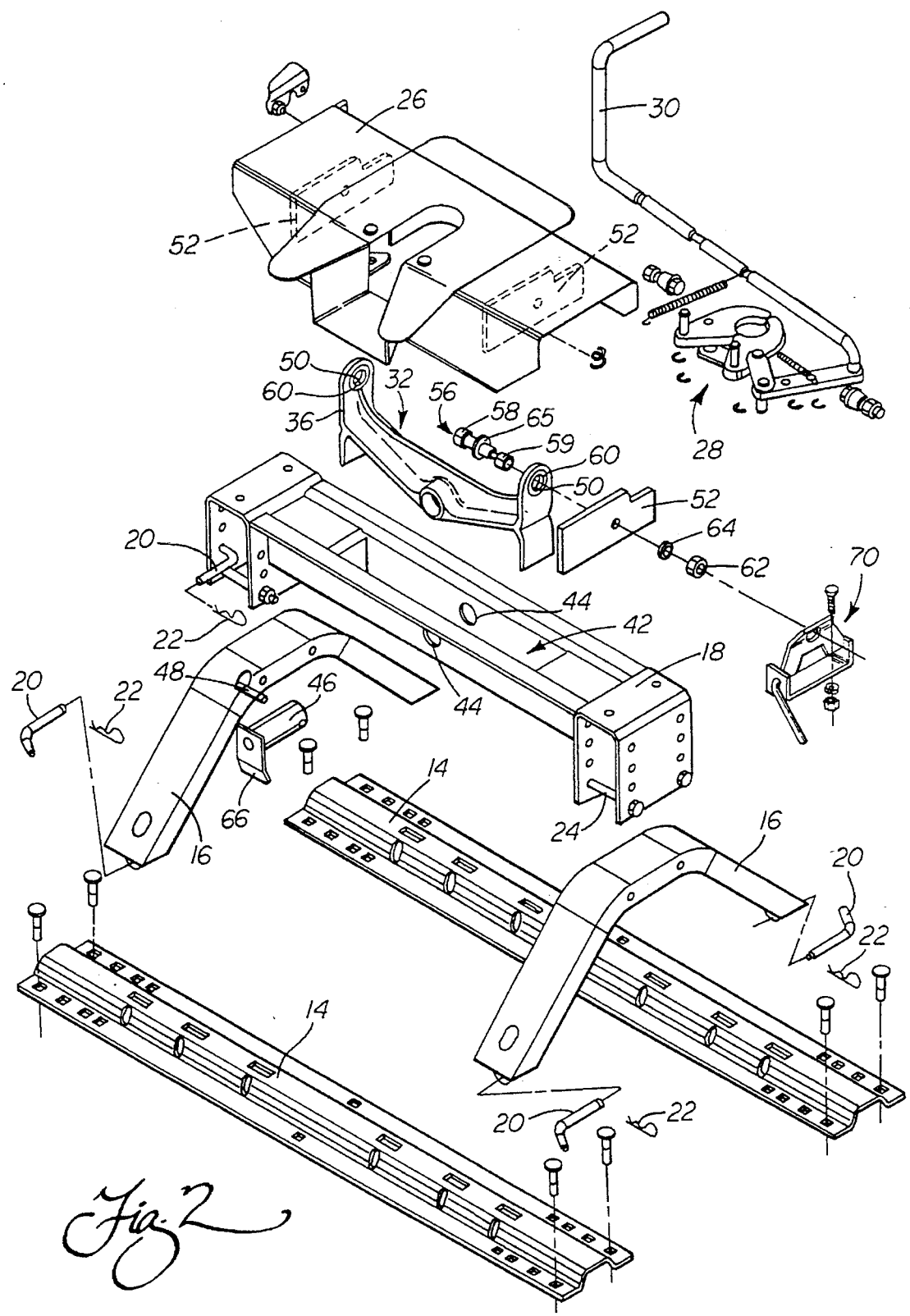
FIG. 2 is an exploded view of that fifth wheel hitch.

Reference is now made to FIGS. 1 and 2 showing the fifth wheel hitch 10 of the present invention for towing a trailer behind a towing vehicle. As shown best in FIG. 2, the hitch 10 includes a frame, generally designated by reference numeral 12, comprised of a pair of spaced, parallel mounting rails 14, a pair of side brackets 16 and a head support 18.

The mounting rails 14 are mounted directly to the towing vehicle in a manner well known in the art. For example, the mounting rails 14 may be positioned in the bed of a pickup truck with one forward and one rearward of the rear axle. There the rails 14 are bolted in position to the bed and frame of the vehicle.

The side brackets 16 are releasably mounted to the mounting rails by means of pull pins 20 that are held in position by spring cotter pins 22. The head support 18 is then mounted as a cross member between the side brackets 16 at a selected height by nut and bolt fasteners 24 that extend through cooperating apertures through the head support and side brackets.

The hitch 10 also includes a head assembly, generally designated by reference numeral 26. As is known in the art, the head assembly 26 is adapted to connect with the king pin K of the trailer to be towed. Toward this end the head assembly 26 includes a jaw assembly 28 of a type known in the art that may be releasably locked by means of a control handle 30 to secure the king pin K of the trailer in a manner known in the art.

As best appreciated from a review of FIG. 2, the head assembly 26 is pivotally mounted to the head support 18 of the support frame 12 by means of a pivot beam 32. Pivot beam 32 includes a cross member 34 that interconnects two opposed uprights 36. A mounting aperture 38 is provided in the center of the cross member 34.

The head assembly 26 is secured to the uprights 36 of the pivot beam 32. More specifically, the uprights 36 each include a mounting aperture 50. The two mounting apertures 50 are aligned so as to provide a pivotal axis. A pair of spaced, parallel downwardly depending flanges 52 carried by the head assembly 26 include apertures 54 that may be aligned with the mounting apertures 50 in the uprights 36. A pivot 56, shown as a bolt 58, is extended through (1) the spacing washer 59, (2) the bushing 60 provided in the mounting aperture 50 and (3) the aligned mounting aperture 54 to secure the head assembly 26 to each upright 36. A nut 62 and lock washer 64 are utilized to secure each bolt 58 in position.

Next, the pivot beam 32, with attached head assembly 26 is positioned in a cavity 42 in the head support 18. The pivot beam 32 and attached head assembly 26 are then manipulated to align the mounting aperture 38 with cooperating, aligned mounting apertures 44 in the head support 18. The main pivot pin 46 is then extended through the aligned apertures 38, 44 and secured in position with a ball lock pin 48.

Advantageously, the pivot beam 32 allows the head assembly 26 to pivot in two orthogonal directions with respect to the support frame 12. More specifically, the pivot beam 32 and, therefore the head assembly 26 carried thereon, pivots about a first axis in a side-to-side direction about main pivot pin 46. The extent of this pivotal movement is limited by the engagement of the lowermost edge of the uprights 36 with the bottom wall of the cavity 42 formed in the head support 18. The maximum pivotal angle from the horizontal is about 4.5°. Advantageously, this side-to-side pivoting action makes possible full contact between the king pin plate P and head assembly 26 eliminating the binding on the jaw assembly 28 during hook-up and unhooking under off-level (side slope) conditions. Without this side-to-side pivoting action, it would sometimes be found to be impossible to hook-up or unhook the trailer without first jacking up one side; an inconvenient and time consuming task.

The head assembly 26 also pivots along a second axis about the aligned bushings 60 in a fore-and-aft direction. Together, the combined side-to-side and fore-and-aft pivotal movement of the head assembly 26 ensures that the head assembly is able to closely follow the trailer king pin K during towing. This is true even when traversing a grade and/or maneuvering in tight quarters at low speeds when the vehicle is turned sharply. As a result of this pivotal movement in two orthogonal directions, the jaw assembly 28 is maintained at a more preferred angle to fully engage the king pin K. Accordingly, twisting of the king pin relative to the jaw assembly 28 is minimized and the jaw assembly is subjected to less stress and strain thereby reducing wear and fatigue and increasing the service life of this mechanism.

While the dual pivoting action of the head assembly 26 in the fore-and-aft and side-to-side directions is desired during connection/disconnection of a trailer and particularly at times during low speed towing when it is necessary to provide utmost maneuverability, side-to-side pivotal movement of the head assembly is not always preferred by an operator during high speed towing such as highway driving. More particularly, some operators have found that they prefer a fifth wheel hitch providing a more rigid connection to the trailer. This may be accomplished by defeating the side-to-side pivotal movement of the head assembly 26 so that only fore-and-aft pivotal movement is possible. In this way it is also possible to provide for the driving comfort of operators that prefer the performance characteristics of a more rigid hitch assembly.

To achieve this end, the present invention also incorporates a side pivot lock mechanism, generally designated by reference numeral 70 (see FIG. 3) that functions to selectively prevent at the operator's option any pivotal movement of the head assembly 26 in the side-to-side direction. More specifically, the side pivot lock mechanism 70 includes a contoured late 72 that is pivotally mounted in a U-shaped yoke 74. The yoke 74 is mounted to the head support 18 of the frame 12 by any means known in the art such as nut and bolt fasteners 76. A control handle 78, may be integrally formed or welded to the plate 72 so as to allow the plate to be manually manipulated between an unlocked position and a locked position shown, respectively, in full and dashed lines in FIG. 4.

More specifically, in the unlocked position, the contoured plate 72 is maintained disengaged and free from the pivot 56 at one side of the pivot beam 32. Accordingly, the pivot beam 32 is allowed to freely pivot about the main pivot pin 46 to provide relative side-to-side movement of the head assembly 26. Further, it should be appreciated that the head assembly 26 is free to pivot about the aligned pivots 56 to also provide relative fore-and-aft movement. This position of the side pivot lock mechanism 70 may be selected by the vehicle operator to aid in connecting/disconnecting the trailer from the hitch 10 or at any other desired time such as to reduce the transmission of vibrations from the trailer to the passenger compartment of the towing vehicle.

For purposes of highway driving, however, the contoured plate 72 may, at the operator's option, be manually pivoted through operation of the control handle 78 into the locked position shown in full line in FIG. 4. In this position the aperture 80 in the plate 72 is received over and around the pivot 56 at one end of the pivot beam 32. This engagement of the pivot 56 by the contoured plate 72 restricts the movement of the pivot beam 32 and thereby prevents relative side-to-side pivotal movement of the head assembly 26. In effect, the pivot beam 32 and head assembly 26 are positively held in a horizontal side-to-side plane. As should be appreciated, however, the head assembly 26 is allowed to freely pivot about the pivot 56 in a fore-and-aft direction. Accordingly, the head assembly 26 of the hitch 10 is responsive to shifting load conditions such as resulting from travel over uphill and downhill grades. Further, the rigid side-to-side platform now provided by the head assembly 26 provides other performance features that some individuals favor over a more compliant hitch assembly allowing both fore-and-aft and side-to=side pivotal movement.

As should further be appreciated, a tension spring 82 is provided to positively maintain the side pivot lock mechanism 70 in both the locked and unlocked positions. As best shown in FIG. 3, the spring 82 includes a first end operatively connected to the pivotable plate 72 and a second end operatively connected to the yoke 74. The longest spring pull is provided when the plate 72 is in an intermediate, transitional position between the unlocked and locked position shown in FIGS. 3 and 4. The spring 82 retracts from this intermediate position drawing or biasing the contoured plate 72 toward the locked position on one side and the unlocked position on the other side. Thus, the spring 82 effectively functions to positively hold the contoured plate 72 in engagement with the pivot 56 on the pivot beam 32 in the locked position or disengage therefrom in the unlocked position as desired by the operator.

In summary, numerous benefits result from employing the concepts of the present invention. The fifth wheel hitch 10 provides superior performance characteristics during connection/disconnection of a trailer while providing a head assembly 26 capable of pivoting in both fore-and-aft and side-to-side directions. This capability of pivotal movement in two orthogonal directions also effectively enhances the ability of the head assembly to follow the trailer king pin and plate during towing. Accordingly, maneuverability is significantly improved. As the head assembly is relatively compliant, the transmission of vibration from the trailer to the towing vehicle is also minimized. In addition, when desired, the operator may use the side pivot lock mechanism 70 to defeat the side-to-side pivoting function to provide a more rigid towing platform. Thus, a versatile hitch assembly is provided that may be adjusted to provide performance characteristics meeting the needs and desires of substantially any individual under substantially any road and weather conditions.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A fifth wheel hitch assembly for pulling a trailer behind a towing vehicle, comprising:

a frame for mounting to the towing vehicle;

a head assembly including jaw means for engaging the trailer;

a mounting means providing for pivotal movement of said head assembly relative to said frame in fore-and-aft and side-to-side directions; and means for selectively preventing pivotal movement in said side-to-side direction, said means for selectively preventing pivotal movement including a contoured plate pivotally mounted in-a U-shaped yoke fixed to said frame, said contoured plate being selectively displaceable between a locked position wherein said contoured plate engages said pivot beam and prevents relative side-to-side pivotal movement and an unlocked position wherein said contoured plate is disengaged from said pivot beam thereby allowing for relative side-to-side pivotal movement.

2. A fifth wheel hitch assembly for pulling a trailer behind a towing vehicle, comprising:

a frame for mounting to the towing vehicle;

a head assembly including jaw means for engaging the trailer;

a mounting means providing for pivotal movement of said head assembly relative to said frame and the towing vehicle in fore-and-aft and side-to-side directions, said mounting means including a pivot beam and a pair of main pivot pins for mounting said pivot beam to said frame for pivotal side-to-side movement, said pivot beam including two opposing uprights and a head assembly mounting aperture in each upright wherein said head assembly mounting apertures in said uprights are aligned and one of said pair of pivot pins is received in each of said apertures for connecting said head assembly so as to allow relative pivotal fore-and-aft movement; and means for selectively preventing pivotal movement in the side-to-side direction, said means for selectively preventing pivotal movement including a contoured plate pivotally mounted in a U-shaped-yoke fixed to said frame, said contoured plate being selectively displaceable between a locked position wherein said contoured plate engages said pivot beam and prevents relative side-to-side pivotal movement and an unlocked position wherein said contoured plate is disengaged from said pivot beam thereby allowing for relative side-to-side pivotal movement.

3. The fifth wheel hitch assembly set forth in claim 2, further including a control handle operatively connected to said contoured plate for manually manipulating said contoured plate between the locked and unlocked positions.

4. The fifth wheel hitch assembly set forth in claim 3, further including spring means operatively connected to said contoured plate for biasing said contoured plate into both the locked and unlocked positions.

5. The fifth wheel hitch assembly set forth in claim 4, wherein said contoured plate includes an aperture for engaging one of said pivots on said pivot beam.

6. The fifth wheel hitch assembly set forth in claim 2, further including spring means operatively connected to said contoured plate for biasing said contoured plate into both the locked and unlocked positions.

7. The fifth wheel hitch assembly set forth in claim 2, wherein said contoured plate includes an aperture for engaging one of said pivots on said pivot beam.

8. A fifth wheel hitch assembly for pulling a trailer behind a towing vehicle, comprising:

a frame for mounting to the towing vehicle;

a head assembly including jaw means for engaging the trailer;

a mounting means providing for pivotal movement of said head assembly relative to said frame and the towing vehicle in fore-and-aft and side-to-side directions, said mounting means including a pivot beam and a pair of main pivot pins for mounting said pivot beam to said frame for pivotal side-to-side movement, said pivot beam including two opposing uprights and a head assembly mounting aperture in each upright wherein said head assembly mounting apertures in said uprights are aligned and one of said pair of pivot pins is received in each of said apertures for connecting said head assembly so as to allow relative pivotal fore-and-aft movement; and means for selectively preventing pivotal movement in the side-to-side direction, said means for selectively preventing pivotal movement being a contoured plate pivotally mounted in a U-shaped yoke fixed to said frame, said contoured plate being selectively displaceable between a locked position wherein said contoured plate engages one of said pivots on said pivot beam and prevents relative side-to-side pivotal movement and an unlocked position wherein said contoured plate is disengaged from said pivot thereby allowing for relative side-to-side pivotal movement.

9. The fifth wheel hitch assembly set forth in claim 8, further including a control handle operatively connected to said contoured plate for manually manipulating said contoured plate between the locked and unlocked positions.

10. The fifth wheel hitch assembly set forth in claim 9, further including spring means operatively connected to said contoured plate for biasing said contoured plate into both the locked and unlocked positions.

11. The fifth wheel hitch assembly set forth in claim 10, wherein said contoured plate includes an aperture for engaging said pivot on said pivot beam.

12. The fifth wheel hitch assembly set forth in claim 8, further including spring means operatively connected to said contoured plate for biasing said contoured plate into both the locked and unlocked positions.

13. The fifth wheel hitch assembly set forth in claim 8, wherein said contoured plate includes an aperture for engaging said pivot on said pivot beam.

14. A fifth wheel hitch assembly for pulling a trailer behind a towing vehicle, comprising:

a frame for mounting to the towing vehicle;

a head assembly including jaw means for engaging the trailer;

a mounting means providing for pivotal movement of said head assembly relative to said frame in fore-and-aft and side-to-side directions; and means for selectively preventing pivotal movement in said side-to-side direction, said means for selectively preventing pivotal movement including a contoured plate pivotally mounted in a U-shaped yoke fixed to said frame; said contoured plate being selectively displaceable between a locked position wherein said contoured plate engages one of said pivots on said pivot beam and prevents relative side-to-side pivotal movement and an unlocked position wherein said contoured plate is disengaged from said pivot thereby allowing for relative side-to-side pivotal movement.

\* \* \* \* \*